United States Patent
Russell

(10) Patent No.: US 7,519,967 B1
(45) Date of Patent: Apr. 14, 2009

(54) FACILITATING BIASED SYNCHRONIZATION IN AN OBJECT-BASED SYSTEM

(75) Inventor: Kenneth B. Russell, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 665 days.

(21) Appl. No.: 11/156,308

(22) Filed: Jun. 17, 2005

(51) Int. Cl.
*G06F 9/46* (2006.01)

(52) U.S. Cl. .................. 718/102; 718/104; 719/316

(58) Field of Classification Search ............... 718/102, 718/104; 719/316
See application file for complete search history.

(56) References Cited

U.S. PATENT DOCUMENTS

| | | | |
|---|---|---|---|
| 6,487,652 B1 | 11/2002 | Gomes et al. | 712/23 |
| 6,510,437 B1* | 1/2003 | Bak et al. | 707/103 Y |
| 6,523,059 B1 | 2/2003 | Schmidt | 709/100 |
| 6,772,153 B1* | 8/2004 | Bacon et al. | 707/8 |
| 7,209,918 B2* | 4/2007 | Li | 707/8 |
| 2005/0289549 A1* | 12/2005 | Cierniak et al. | 718/102 |
| 2006/0031844 A1* | 2/2006 | Dice et al. | 718/106 |
| 2006/0090168 A1* | 4/2006 | Ogasawara et al. | 719/320 |
| 2008/0072238 A1* | 3/2008 | Monnie et al. | 719/310 |

OTHER PUBLICATIONS

Publication: "Lock Reservation: Java Locks Can Mostly Do Without Atomic Operations", by Kawachiya et al., ACM Conference on Object-Oriented Programming Systems, Languages and Applications (OOPSLA 2002), pp. 130-141.

* cited by examiner

*Primary Examiner*—Andy Ho
(74) *Attorney, Agent, or Firm*—Park, Vaughan & Fleming LLP

(57) ABSTRACT

One embodiment of the present invention provides a system that facilitates biased locking of objects within an object-based computing system. The system encounters a lock-acquisition operation while executing a current thread, wherein the lock-acquisition operation attempts to acquire a lock for an object. In response to the lock-acquisition operation, the system examines synchronization information associated with the object, wherein the process of examining the synchronization information does not involve atomic operations. If the synchronization information indicates that the lock is biasable and that the lock is biased toward the current thread, the system allows the current thread to acquire the lock without updating the synchronization information.

18 Claims, 5 Drawing Sheets

X00 → LOCKED
001 → UNLOCKED
101 → BIASABLE
X10 → INFLATED
X11 → MARKED

FACILITATING BIASED SYNCHRONIZATION IN AN OBJECT-BASED SYSTEM

BACKGROUND

1. Field of the Invention

The present invention relates to object-based computing systems. More specifically, the present invention relates to a method and an apparatus that facilitates biased synchronization of objects within an object-based computing system.

2. Related Art

Object-based computer programs differ from typical function-based computer programs because each element of computation in an object-based computer program is associated with an "object." Furthermore, the structure of each object is defined by an associated data type called a "class."

Many object-based computer systems support "multi-threading." In such multi-threaded systems, multiple threads of execution may attempt to access the same object simultaneously, which can lead to contention problems. For example, FIG. 1 illustrates how a thread 102 and a thread 104 attempt to access the same method 108 within object instance 106.

To correctly arbitrate between these concurrent accesses, the object is typically associated with a mutual-exclusion primitive, such as a mutex or monitor. There is a large body of literature describing various techniques and paradigms for implementing these mutual-exclusion primitives.

Processors that support multi-threading typically provide "atomic operations," which can be used to implement mutual-exclusion primitives. These atomic operations are guaranteed to execute without interference from concurrently executing threads, and without interference from threads on other processors. Because of the complexity involved in ensuring that atomic operations execute without interference from other threads, atomic operations are considerably more time-consuming to execute than ordinary operations, such as additions and subtractions.

Hence, what is needed is a method and an apparatus for implementing mutual-exclusion primitives without the performance problems associated with atomic operations.

SUMMARY

One embodiment of the present invention provides a system that facilitates biased locking of objects within an object-based computing system. The system encounters a lock-acquisition operation while executing a current thread, wherein the lock-acquisition operation attempts to acquire a lock for an object. In response to the lock-acquisition operation, the system examines synchronization information associated with the object, wherein the process of examining the synchronization information does not involve atomic operations. If the synchronization information indicates that the lock is biasable and that the lock is biased toward the current thread, the system allows the current thread to acquire the lock without updating the synchronization information.

In a variation on this embodiment, if the synchronization information indicates that the lock is biasable and the lock is presently unbiased, the system uses an atomic operation to attempt to update the synchronization information to indicate that the lock is biased toward the current thread. If this atomic operation succeeds and the lock is biased toward the current thread, the system allows the current thread to acquire the lock.

In a variation on this embodiment, if the synchronization information indicates that the lock is not biasable, the system falls back to an underlying synchronization technique to acquire the lock.

In a variation on this embodiment, if the synchronization information indicates that the lock is biasable and that the lock is biased toward another thread, the system revokes the bias toward the other thread by: stopping all threads in the object-based computing system at a safe point; determining whether the lock is held by the other thread; and if not, resetting the synchronization information to indicate that the lock is biasable but unbiased, whereby the lock can be subsequently rebiased. If the lock is held, the system resets the synchronization information to indicate that the lock is not biasable and falls back to an underlying synchronization technique to acquire the lock. The system also updates the synchronization information to reflect the locking state of the object in the underlying synchronization technique.

In a variation on this embodiment, the system estimates a rate of bias revocation on a per-data-type basis. If the estimated rate of bias revocation for a given data type exceeds a threshold value, the system performs a bulk revocation for all instances of the given data type.

In a further variation, if revocations for objects of the given data type persist, the system ensures that all subsequently created instances of the given data type are not biasable. The system also performs a bulk revocation which ensures that all existing instances of the given data type are not biasable.

In a variation on this embodiment, when the system encounters a lock-release operation while executing the current thread, the system allows the current thread to release the lock without updating the synchronization information if the object was biased toward the current thread.

In a variation on this embodiment, the synchronization information associated with the object is contained within a synchronization word within the object.

DETAILED DESCRIPTION

Figures 1, 2:
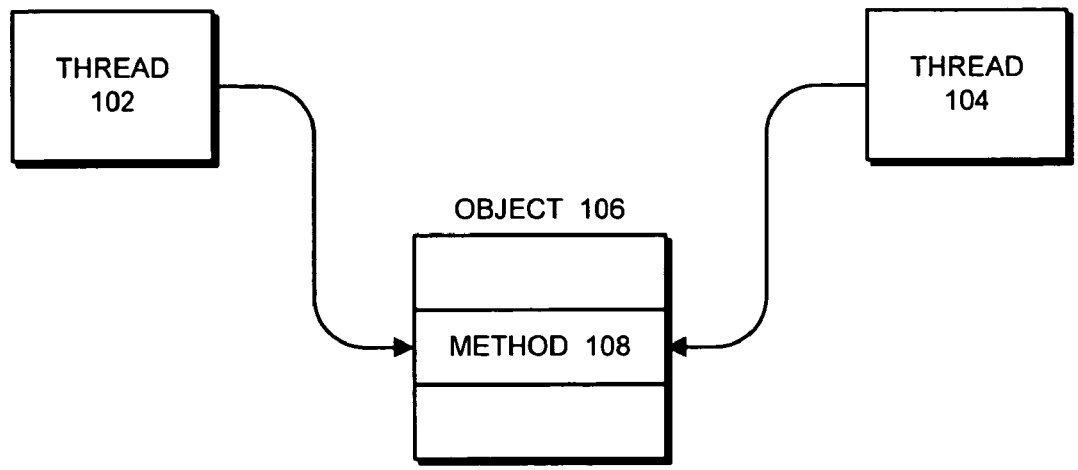
FIG. 1 illustrates two threads attempting to access the same method in an object instance.
FIG. 2 illustrates exemplary bit patterns that indicate whether an object is biasable and/or locked in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Overview

The present invention provides a mechanism for performing biased synchronization in an object-based system. In such a system, one word of an object is typically devoted to storing synchronization information that indicates which thread owns the object's lock. A thread must generally update this word with atomic operations to acquire and release the lock. The present invention substantially reduces the number of atomic operations required to perform these actions.

The present invention solves a number of problems found in existing object-based systems that support multi-threading. (1) It provides a mechanism to reacquire and re-release a biased lock without writing to the object's synchronization word. (2) It provides a technique for re-biasing an object to another thread if ownership of the object has substantially transferred to the other thread. (3) It also provides support for biased locking for arbitrary classes instead of a selected few.

The present invention builds upon an underlying synchronization technique which necessarily differs from the present invention. In a preferred embodiment, the underlying synchronization technique described in U.S. Pat. No. 6,510,437, entitled "Method and Apparatus for Concurrent Thread Synchronization," by inventors Lars Bak and Timothy G. Lindholm uses records on a thread's stack to help describe the locking state of a given object. The following descriptions are written in terms of this underlying synchronization technique, though it will be apparent to practitioners skilled in the art that the present invention is applicable to other underlying synchronization techniques.

The present invention is described in more detail in the following disclosure.

Process of Acquiring a Lock

In one embodiment of the present invention, when an object is newly allocated, a "bias indicator" (such as a bias bit) may be set in a synchronization word in the object to indicate that it is capable of being biased toward a thread. For example, the "mark word" in an object's header (which is typically used to store state information for garbage-collection purposes) can also be used to store state information related to locking.

Referring to FIG. 2, in one embodiment of the present invention, the three least-significant bits of the mark word for an object are used to indicate whether the object is locked and/or biasable. If the three least significant bits are 101, the object is biasable. Otherwise, the object is not biasable, and the lock state of the object is governed by the underlying synchronization technique. In this technique, if the three least-significant bits are 001, the object is unlocked. If the three least-significant bits are X00 (where X is a don't care), the object is "lightweight locked". If the three least-significant bits are X10, the object is "inflated", which means that it is associated with a heavyweight locking primitive. Finally, if the three least-significant bits are X11, the object is marked for garbage-collection purposes.

One embodiment of the present invention requires that appropriate memory alignment of thread identifiers in the application be observed to ensure the so-called "bias bit", and optionally the age bits, will never be used in the binary representation of the thread identifier. This potentially consumes additional memory because the thread identifier may have to be relocated in memory. However, the requirement eliminates the need for an extra word in the object and allows the technique to be used with all data types in the system rather than a select few.

Figure 3A:
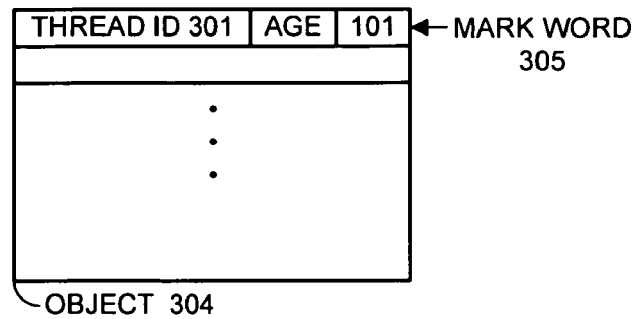
FIG. 3A illustrates the state of an object after the object has been biased by a given thread in accordance with an embodiment of the present invention.

The first thread which acquires the lock examines the mark word to determine whether the lock is biasable. If so, the thread uses an atomic operation to attempt to place its thread identifier into the synchronization word, wherein the thread identifier is masked with appropriate bits to indicate that the contents of the synchronization word represent a lock biased toward that thread. For example, in FIG. 3A an object 304 contains a mark word 305 in its header. The three least significant bits of mark word 305 are set to 101 to indicate that the object is biasable. The high bits are set to contain the thread identifier 301. Note that other bits of mark word 305 may contain other information, such as the generational garbage collection age for the object.

Subsequent acquisitions of the lock by the thread toward which the lock is biased simply check the contents of the synchronization word of the object and ensure that it is equal to the identifier of the current thread, masked with appropriate bits; no stores to the main memory are performed. On the other hand, if the lock is not biasable, an underlying synchronization technique that performs atomic operations is used to acquire the lock.

Figure 3B:
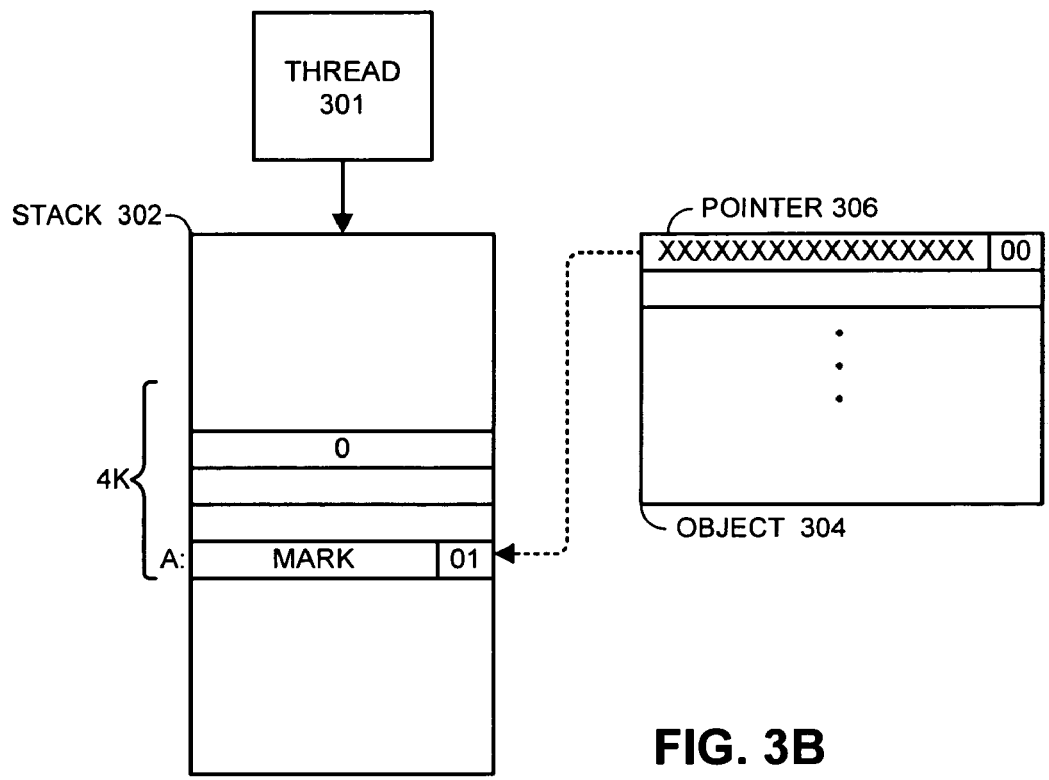
FIG. 3B illustrates a thread stack and an associated object after the object's bias has been revoked and an underlying synchronization technique is being used to describe the lock state of the object.

In one embodiment of the present invention, the underlying synchronization technique maintains records on the thread's stack each time a lock is acquired and released by that thread. These stack records allow the system to detect mismatched lock/unlock pairs, and also to record recursive entries of the same lock. For example, in FIG. 3B, object 304 is locked by an underlying synchronization technique by copying the contents of mark word 305 to a location in the stack 302 of the thread that holds the lock. At the same time, mark word 305 is replaced with a pointer 306 to the location (A) in the stack 302 containing the copied contents of mark word 305. Note that since the last two bits of every pointer are 00 in a 32-bit machine, the last two bits of the pointer 306 will be 00, which indicates that the object is locked (see FIG. 2).

In one embodiment of the present invention, while the object remains biased toward a given thread, the stack records are filled in lazily; this provides part of the efficiency of the present invention. Releases of the lock by the thread toward which it is biased simply check the presence of the bias bits in the synchronization word of the object. Invariants of block-structured locking and higher-level checks in the system ensure that a thread will only attempt to unlock a biased lock if it has actually acquired the lock, so the thread identifier itself need not be checked in the release path in order to report mismatched lock/unlock pairs.

If a second thread attempts to acquire an object's lock biased toward a first thread, the bias is revoked. This revocation operation involves the following steps. First, a safe point is reached in which no threads are executing code related to the object-based system. At this point, the thread toward which the object is biased is identified from the synchronization word of the object. The identified thread's stack is walked, to enumerate all of the stack records associated with the object that have not yet been filled in yet. These stack records, if any, are filled in with values appropriate to the locking state of the object, and the object's synchronization word is updated to point to the bottommost stack record. Subsequent lock operations will not use the biased locking method but will instead fall through to the underlying synchronization method.

Details of Lock Acquisition

Figure 4:
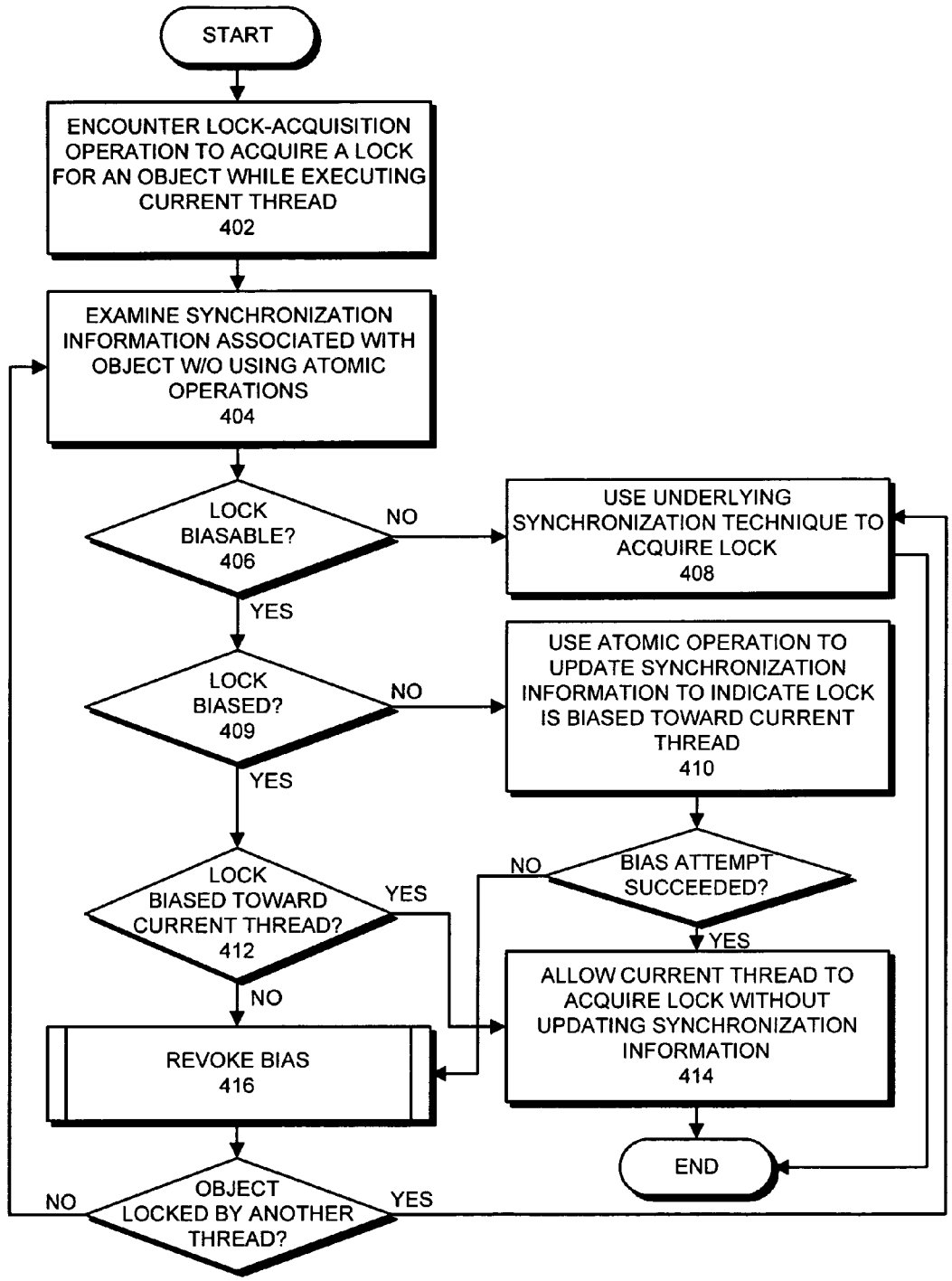
FIG. 4 presents a flow chart illustrating the process of acquiring a lock in accordance with an embodiment of the present invention.

Referring to FIG. 4, we now describe the process of acquiring a lock in more detail. First, the system encounters a lock-acquisition operation while executing a current thread (step 402).

In response to this lock-acquisition operation, the system examines synchronization information associated with the object without using atomic operations to determine whether the lock is biasable and if so whether it is presently biased (step 404). In one embodiment of the present invention, this involves exclusive-ORing the mark word with the current thread identifier to determine if the thread identifier matches the current thread. The system also examines the three least-significant bits of the mark word to determine the lock state of the object instance. (In one embodiment of the present invention, the current thread's pointer to thread-local storage is used as the identifier for the current thread.)

If the lock is not biasable, the system uses the underlying synchronization technique to acquire the lock (step 408).

Otherwise, if the lock is biasable but is not biased, the system uses an atomic operation (such as a compare-and-swap) to update synchronization information associated with the object to indicate that the lock is biased toward the current thread (step 410). In one embodiment of the present invention, this involves constructing a value to be swapped into the mark word by ORing together: an identifier for the current thread (ThreadID); garbage-collection-related age bits for the object instance (AGE); and the lock state "101" for the object to produce "ThreadID|AGE|101". The system then performs an atomic operation, which compares the mark word with a value indicating that the object is biasable but not biased toward a thread "AGE|101". If this comparison succeeds, the atomic operation swaps the mark word with the constructed value, which biases the object toward the current thread.

The system then allows the current thread to acquire the lock without updating the synchronization information (step 414).

If at step 404 the lock is biasable and is presently biased toward the current thread, the system also allows the current thread to acquire the lock without updating the synchronization information (step 414).

On the other hand, if the lock is biasable and is presently biased toward another thread, the system attempts to revoke the bias for the other thread (step 416). If the revocation is successful, the system returns to step 404 so that the current thread can hopefully obtain the bias for the object and acquire the lock.

Revoking a Bias

Figure 5:
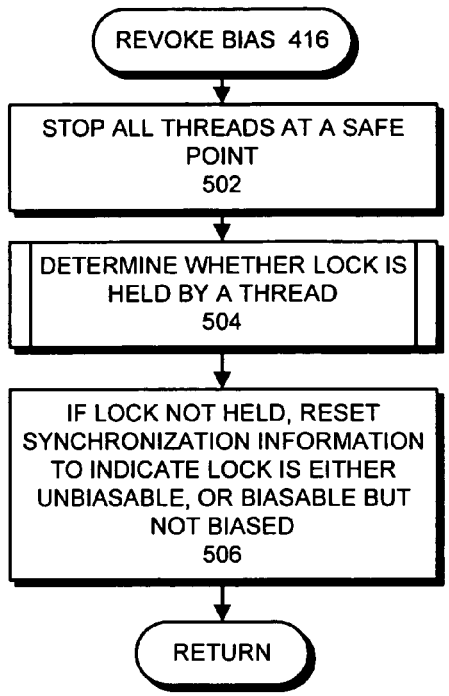
FIG. 5 presents a flow chart illustrating the process of attempting to revoke a bias in accordance with an embodiment of the present invention.

FIG. 5 presents a flow chart illustrating the process of attempting to revoke a bias for an object in accordance with an embodiment of the present invention. This flow chart illustrates the operations involved in step 414 in FIG. 4. The system first stops all concurrently executing threads in the system at a safe point (step 502). The system then determines whether the lock is held by a thread (step 504). If the lock is not held, the system resets synchronization information for the object to indicate that the lock is either not biasable, or biasable but not biased (step 506), depending on the bulk revocation technique described below.

Figure 6:
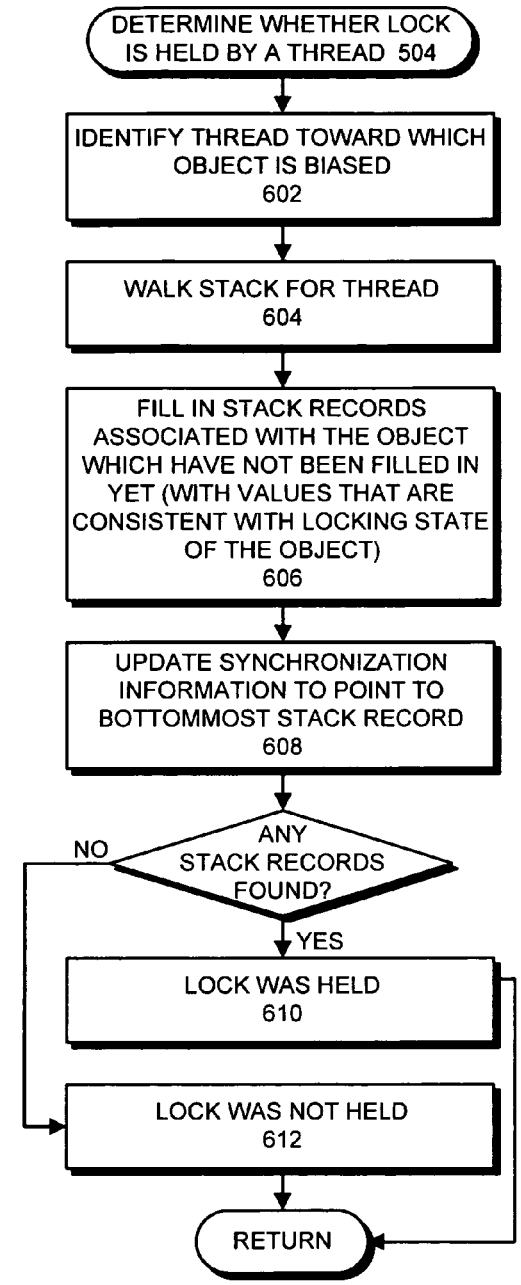
FIG. 6 presents a flow chart illustrating the process of determining whether a lock is held by a thread in accordance with an embodiment of the present invention.

Otherwise, if the lock is held, the lock state of the object must be updated to be correct with respect to the underlying synchronization technique. FIG. 6 presents a flow chart illustrating the process of determining whether a lock is held by a thread and updating its lock state if so in accordance with an embodiment of the present invention. The system first identifies the thread toward which the object is biased (step 602). Next, the system walks the stack for the identified thread (step 604). During this stack walk, the system fills in stack records associated with the object that have not been filled in yet (step 606). These stack records are filled with values that are consistent with the locking state of the object. For example, lock records on the stack associated with recursive locks are set to zero, and the bottommost lock is set to AGE|001 indicating that the lock is not biasable. Finally, the system updates synchronization information for the object to point to the bottommost stack record (step 608). If any stack records were found, the lock was held by the thread toward which the object was biased (step 610); if none were found, the lock was not held (step 612).

Bulk Revocation

Some applications transfer ownership of objects from one thread to another, and it is desirable to support biased locking in this situation as well as in the case where an object is locked and unlocked by only a single thread. In the case where a large number of instances of an object type will be re-biased, it may be beneficial to perform such an action in bulk instead of individually. The present invention facilitates this type of bulk re-biasing through a "bulk revocation" operation.

Figure 7:
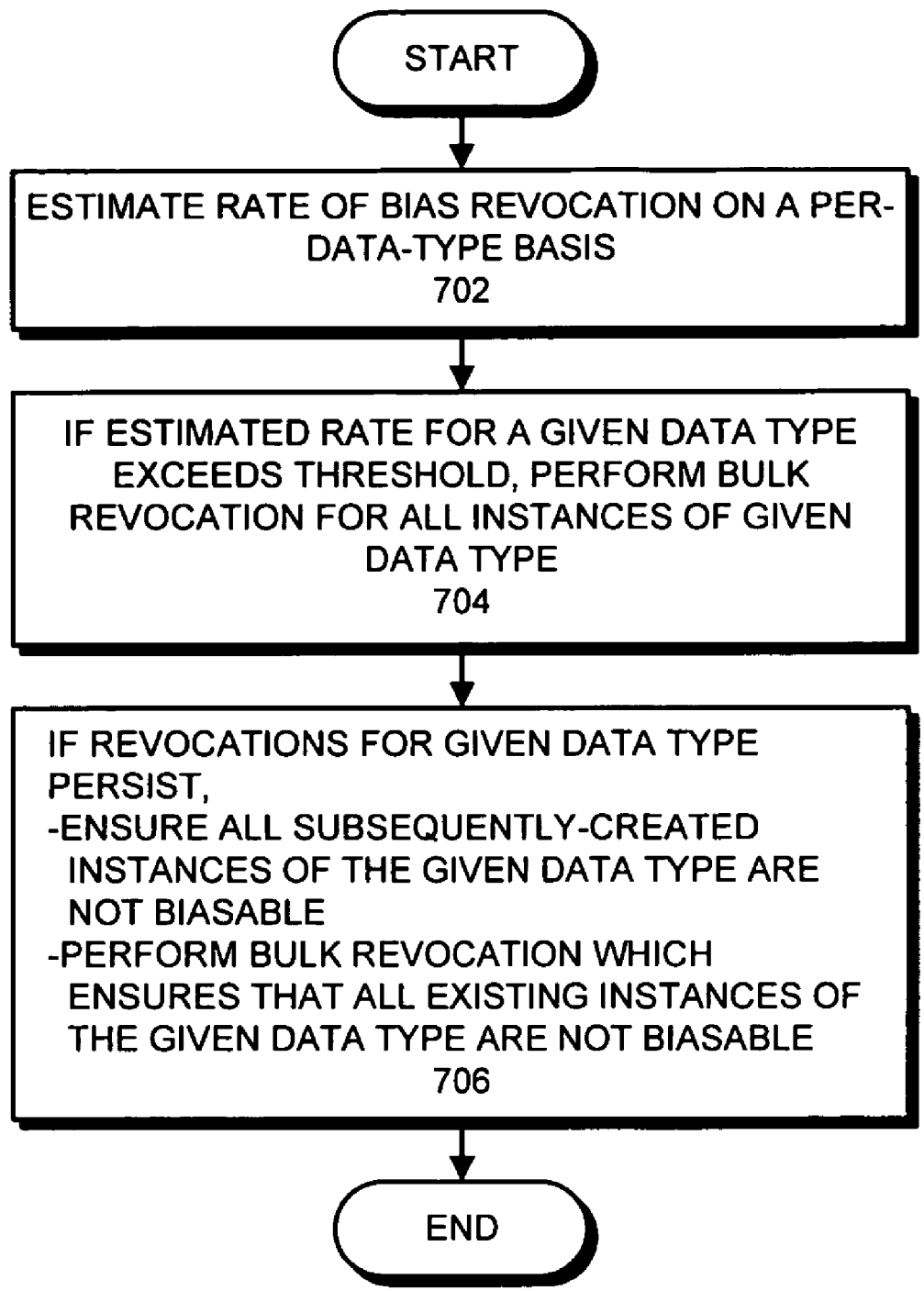
FIG. 7 presents a flow chart illustrating a bulk revocation operation for all instances of a given data type in accordance with an embodiment of the present invention.

FIG. 7 presents a flow chart illustrating a bulk revocation operation for all instances of a given data type in accordance with an embodiment of the present invention. The system periodically estimates the rate of bias revocation on a per-data-type basis during the revocation process (step 702).

If the estimated rate for a given data type exceeds a threshold, the system performs a "bulk revocation" for all instances of the given data type (step 704). This is accomplished by scanning the object heap to locate all instances of that data type. If an instance is currently biased, that bias is revoked. If the instance is not actually locked by the thread toward which it was biased, the object's synchronization word is reset to the initial state, allowing it to be biased again. Note that this technique allows multiple threads to perform efficient synchronization if a set of objects are repeatedly transferred from one thread to another, unlike existing techniques, which allow at most one thread to perform such efficient synchronization.

Next, if revocations for the given data type continue to persist at an inefficiently high level, the system ensures that all subsequently-created instances of the given data type are marked so that they are not biasable. This can be accomplished by setting a flag in the class for the object, which prevents future instances of that class from setting the bias bit in their synchronization word during allocation. The system then performs a bulk revocation to ensure that all existing instances of the given data type are not biasable. This prevents subsequent re-biasing of the affected objects (step 706).

The change to the object creation process and the bulk revocation operation described above limit the aggregate overhead associated with revoking biases, which reduces any potential performance losses associated with frequent bias revocations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating biased locking of objects within an object-based computing system, comprising:
   encountering a lock-acquisition operation while executing a current thread, wherein the lock-acquisition operation attempts to acquire a lock for an object;
   in response to the lock-acquisition operation, examining synchronization information associated with the object, wherein the process of examining the synchronization information does not involve atomic operations;
   if the synchronization information indicates that the lock is biasable and that the lock is biased toward the current thread, allowing the current thread to acquire the lock without updating the synchronization information; and
   if the synchronization information indicates that the lock is biasable and that the lock is biased toward another thread revoking the bias toward the other thread by:
      stopping all threads in the object-based computing system at a safe point;
      determining whether the lock is held by the other thread;
      if not, resetting the synchronization information to indicate that the lock is biasable but unbiased whereby the lock can be subsequently rebiased; and
      if the lock is held, resetting the synchronization information to indicate that the lock is not biasable, and falling back to an underlying synchronization technique to acquire the lock, and also updating the synchronization information to reflect the locking state of the object in the underlying synchronization technique;
   wherein acquiring the lock for the object without atomic operations reduces the number of hardware operations the current thread needs to execute on the object-based computing system to acquire the lock.

2. The method of claim 1, wherein if the synchronization information indicates that the lock is biasable and the lock is presently unbiased, the method further comprises:
   using an atomic operation to attempt to update the synchronization information to indicate that the lock is biased toward the current thread; and
   if the atomic operation succeeds and the lock is biased toward the current thread, allowing the current thread to acquire the lock.

3. The method of claim 1, wherein if the synchronization information indicates that the lock is not biasable, the method further comprises using an underlying synchronization technique to acquire the lock.

4. The method of claim 1, wherein determining if the lock is held by the other thread involves:
   walking a stack for the other thread to enumerate stack records associated with the object that have not been filled in yet;
   filling in the enumerated stack records with values that are consistent with the locking state of the object; and
   if any stack records were found, indicating that the lock is held by the other thread, updating the synchronization information associated with the object to reference the bottommost stack record associated with the object.

5. The method of claim 1, wherein the method further comprises:
   estimating a rate of bias revocation on a per-data-type basis; and
   if the estimated rate of bias revocation for a given data type exceeds a threshold value, performing a bulk revocation for all instances of the given data type.

6. The method of claim 5, wherein if revocations for objects of the given data type persist, the method further comprises:
   ensuring that all subsequently created instances of the given data type are not biasable; and
   performing a bulk revocation which ensures that all existing instances of the given data type are not biasable.

7. The method of claim 1, wherein the method further comprises:
   encountering a lock-release operation while executing the current thread, wherein the lock-release operation attempts to release the lock for the object; and
   in response to the lock-release operation, allowing the current thread to release the lock without updating the synchronization information if the object was biased toward the current thread.

8. The method of claim 1, wherein the synchronization information associated with the object is contained within a synchronization word within the object.

9. A computer-readable storage medium storing instructions that when executed by a computer cause the computer to perform a method for facilitating biased locking of objects within an object-based computing system, the method comprising:
   encountering a lock-acquisition operation while executing a current thread, wherein the lock-acquisition operation attempts to acquire a lock for an object;
   in response to the lock-acquisition operation, examining synchronization information associated with the object, wherein the process of examining the synchronization information does not involve atomic operations;
   if the synchronization information indicates that the lock is biasable and that the lock is biased toward the current thread, allowing the current thread to acquire the lock without updating the synchronization information; and
   if the synchronization information indicates that the lock is biasable and that the lock is biased toward another thread revoking the bias toward the other thread by:
      stopping all threads in the object-based computing system at a safe point;
      determining whether the lock is held by the other thread;
      if not, resetting the synchronization information to indicate that the lock is biasable but unbiased, whereby the lock can be subsequently rebiased; and
      if the lock is held, resetting the synchronization information to indicate that the lock is not biasable, and falling back to an underlying synchronization technique to acquire the lock, and also updating the synchronization information to reflect the locking state of the object in the underlying synchronization technique;
   wherein acquiring the lock for the object without atomic operations reduces the number of hardware operations the current thread needs to execute on the object-based computing system to acquire the lock.

10. The computer-readable storage medium of claim 9, wherein if the synchronization information indicates that the lock is biasable and the lock is presently unbiased, the method further comprises:

using an atomic operation to attempt to update the synchronization information to indicate that the lock is biased toward the current thread; and if the atomic operation succeeds and the lock is biased toward the current thread, allowing the current thread to acquire the lock.

11. The computer-readable storage medium of claim 9, wherein if the synchronization information indicates that the lock is not biasable, the method further comprises using an underlying synchronization technique to acquire the lock.

12. The computer-readable storage medium of claim 9, wherein determining if the lock is held by the other thread involves:

walking a stack for the other thread to enumerate stack records associated with the object that have not been filled in yet;

filling in the enumerated stack records with values that are consistent with the locking state of the object; and if any stack records were found, indicating that the lock is held by the other thread, updating the synchronization information associated with the object to reference the bottommost stack record associated with the object.

13. The computer-readable storage medium of claim 9, wherein the method further comprises:

estimating a rate of bias revocation on a per-data-type basis; and if the estimated rate of bias revocation for a given data type exceeds a threshold value, performing a bulk revocation for all instances of the given data type.

14. The computer-readable storage medium of claim 13, wherein if revocations for objects of the given data type persist, the method further comprises:

ensuring that all subsequently created instances of the given data type are not biasable; and performing a bulk revocation which ensures that all existing instances of the given data type are not biasable.

15. The computer-readable storage medium of claim 9, wherein the method further comprises:

encountering a lock-release operation while executing the current thread, wherein the lock-release operation attempts to release the lock for the object; and in response to the lock-release operation, allowing the current thread to release the lock without updating the synchronization information if the object was biased toward the current thread.

16. The computer-readable storage medium of claim 9, wherein the synchronization information associated with the object is contained within a synchronization word within the object.

17. An apparatus for facilitating biased locking of objects within an object-based computing system, comprising:

a lock-acquisition mechanism;

wherein when a lock-acquisition operation is executed by a current thread, the lock-acquisition mechanism is configured to examine synchronization information associated with the object, wherein the process of examining the synchronization information does not involve atomic operations;

wherein if the synchronization information indicates that the lock is biasable and that the lock is biased toward the current thread, the lock-acquisition mechanism is configured to allow the current thread to acquire the lock without updating the synchronization information; and wherein if the synchronization information indicates that the lock is biasable and that the lock is biased toward another thread, the lock-acquisition mechanism is configured to revoke the bias toward the other thread by:

stopping all threads in the object-based computing system at a safe point;

determining whether the lock is held by the other thread;

if not, resetting the synchronization information to indicate that the lock is biasable but unbiased, whereby the lock can be subsequently rebiased; and if the lock is held, resetting the synchronization information to indicate that the lock is not biasable, and falling back to an underlying synchronization technique to acquire the lock, and also updating the synchronization information to reflect the locking state of the object in the underlying synchronization technique;

wherein acquiring the lock for the object without atomic operations reduces the number of hardware operations the current thread needs to execute on the object-based computing system to acquire the lock.

18. The apparatus of claim 17, wherein if the synchronization information indicates that the lock is biasable and the lock is presently unbiased, the lock-acquisition mechanism is configured to:

use an atomic operation to attempt to update the synchronization information to indicate that the lock is biased toward the current thread; and if the atomic operation succeeds and the lock is biased toward the current thread, to allow the current thread to acquire the lock.

* * * * *